(12) United States Patent
Arakane et al.

(10) Patent No.: US 11,409,477 B2
(45) Date of Patent: Aug. 9, 2022

(54) IMAGE PROCESSING APPARATUS

(71) Applicant: BROTHER KOGYO KABUSHIKI KAISHA, Nagoya (JP)

(72) Inventors: Satoru Arakane, Nagoya (JP); Hirotoshi Maehira, Nagoya (JP); Masao Mimoto, Kitanagoya (JP); Tsuyoshi Ito, Nagoya (JP); Yasuo Ono, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/210,975

(22) Filed: Mar. 24, 2021

(65) Prior Publication Data

US 2021/0303232 A1 Sep. 30, 2021

(30) Foreign Application Priority Data

Mar. 30, 2020 (JP) .............................. JP2020-059780

(51) Int. Cl.
*G06F 3/12* (2006.01)
*G06K 15/16* (2006.01)
*B41J 13/00* (2006.01)
*G06K 15/02* (2006.01)

(52) U.S. Cl.
CPC ........ *G06F 3/1215* (2013.01); *B41J 13/0009* (2013.01); *G06F 3/1253* (2013.01); *G06K 15/16* (2013.01); *G06K 15/1809* (2013.01)

(58) Field of Classification Search
CPC .. G06F 3/1215; G06F 3/1253; B41J 13/0009; G06K 15/16; G06K 15/1809
See application file for complete search history.

(56) References Cited

U.S. PATENT DOCUMENTS

| 2005/0169650 A1* | 8/2005 | Ito ...................... G03G 15/5029 399/45 |
| 2006/0192804 A1 | 8/2006 | Nakata et al. |
| 2015/0158292 A1 | 6/2015 | Horade |
| 2015/0273901 A1 | 10/2015 | Arai |

(Continued)

FOREIGN PATENT DOCUMENTS

| JP | 2004-1325 A | 1/2004 |
| JP | 2004-351837 A | 12/2004 |
| JP | 2005-41080 A | 2/2005 |

(Continued)

*Primary Examiner* — Huo Long Chen
(74) *Attorney, Agent, or Firm* — Scully, Scott, Murphy & Presser, P.C.

(57) ABSTRACT

There is provide an image processing apparatus including a carriage with a recording head and a sensor mounted thereon, a conveyer, and a controller. The controller carries out: acquiring a recording data, a front edge margin, and a tail edge margin, determining whether or not at least one of first and second reference values is less than a threshold value, and a positioning process. When at least one of the first and second reference values is less than the threshold value, then the controller carries out: a front edge detecting process, a first recording preparation process, and a recording process. When at least one of the first and second reference values is not less than the threshold value, then the controller carries out: a second recording preparation process, and the recording process.

16 Claims, 12 Drawing Sheets

(56) References Cited

U.S. PATENT DOCUMENTS

2015/0352870 A1* 12/2015 Imafuku ............... G06F 3/1244
 347/5
2019/0232686 A1* 8/2019 Zaizen .................. B41J 11/009

FOREIGN PATENT DOCUMENTS

| JP | 2015-110281 A | 6/2015 |
| JP | 2015-193085 A | 11/2015 |

* cited by examiner

Fig. 11A
Fig. 11B
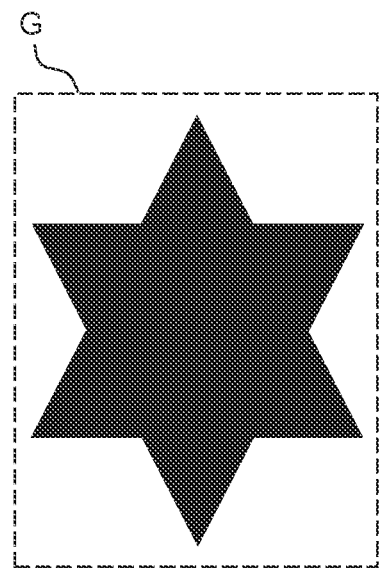
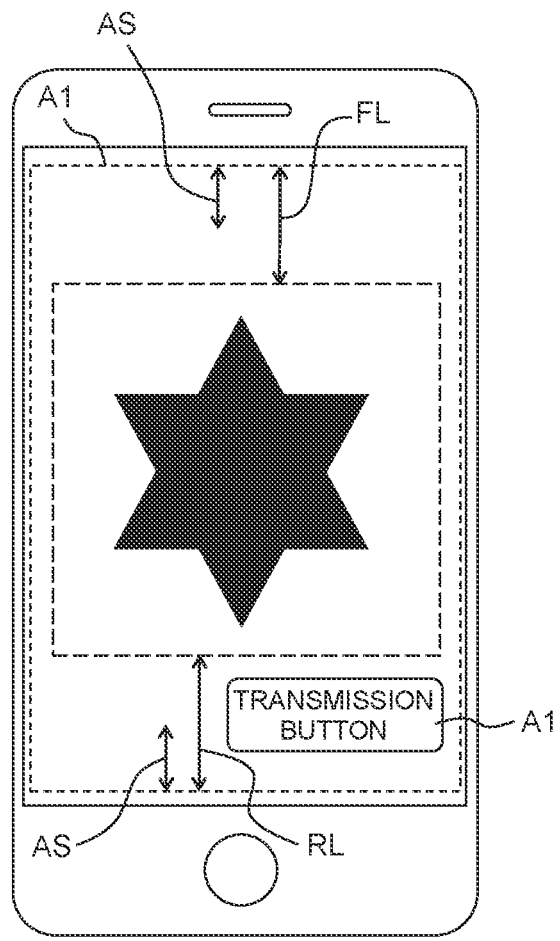

IMAGE PROCESSING APPARATUS

CROSS REFERENCE TO RELATED APPLICATION

The present application claims priorities from Japanese Patent Application No. 2020-059780 filed on Mar. 30, 2020, the disclosures of which are incorporated herein by reference in their entireties.

BACKGROUND

Field of the Invention

The present disclosure relates to image processing apparatuses.

Description of the Related Art

In a publicly-known image processing apparatus, paper is fed by turning on a paper feed clutch to render the rotation of a secondary scanning motor to the paper feeding rollers after moving the carriage before feeding the paper and then positioning the carriage at almost the center of a conveyance belt. Then, the apparatus determines whether or not the front edge of the paper is detected by checking a detecting signal of a paper sensor mounted on the carriage and, from the time when the front edge of the paper is detected, conveys the paper to a predetermined printing start position at which the paper stops moving.

SUMMARY

In the above publicly-known image processing apparatus, in order to detect the front edge of a recording medium, it is necessary to move the carriage to the approximately central position with respect to the primary scanning direction for the recording medium, and then send the recording medium in a secondary direction at a low speed. When the recording medium sent at the low speed finally arrives at the sensor position, because of the response of the sensor, it is possible to correctly recognize the front edge position of the recording medium with respect to the carriage. However, because the time for this operation causes the time for printing to increase, depending on a user, this increase in printing time may act as a large burden on the user.

The present disclosure is made in view of the above situation, and an object thereof is to provide an image processing apparatus capable of suppressing decrease in the printing speed in an image recording process.

According to an aspect of the present disclosure, there is provided an image processing apparatus including: a carriage including a recording head and a sensor, and configured to move in a main scanning direction, wherein the recording head is configured to discharge an ink, and the sensor is configured to output a detecting signal according to existence or non-existence of a recording medium: a conveyer configured to convey the recording medium in a conveyance direction intersecting the main scanning direction; and a controller. The controller is configured to carry out: as an acquiring process, acquiring a recording data for the recording head to record on the recording medium, an front edge margin showing a margin on the front edge side in the conveyance direction from the position where the ink is discharged first in the conveyance direction for the recording medium, and a tail edge margin showing a margin on the tail edge side in the conveyance direction from the position where the ink is discharged last, as a first determining process, determining whether or not at least one of a first reference value based on the front edge margin and a second reference value based on the tail edge margin is less than a threshold value, and as a positioning process, controlling the conveyor to position the recording medium to a predetermined upstream place from the recording head in the conveyance direction. When at least one of the first reference value and the second reference value is less than the threshold value, the controller is configured to carry out: as an front edge detecting process, controlling the conveyer to convey the recording medium in the conveyance direction from the predetermined place to a detecting position where the sensor outputs the detecting signal, after positioning the carriage such that the sensor is positioned on the path where the recording medium is conveyed, as a first recording preparation process, controlling the conveyer to convey the recording medium in the conveyance direction from the detecting position to a recording start position where the ink is discharged first on the recording medium, and as a recording process, controlling the recording head to record the recording data onto the recording medium by discharging the ink. When at least one of the first reference value and the second reference value is not less than the threshold value, the controller is configured to carry out: as a second recording preparation process, controlling the conveyer to convey the recording medium in the conveyance direction from the predetermined place to the recording start position where the ink is discharged first on the recording medium, and the recording process.

According to the present disclosure, it is possible for the image processing apparatus to suppress decrease in the printing speed in an image recording process.

BRIEF DESCRIPTION OF THE DRAWINGS

FIG. 10A shows that a page margin or margin is not less than a determining threshold value AS;

FIG. 10B shows that the margin is less than the determining threshold value AS;

FIG. 11A shows an image data G to be used by an application program: and

FIG. 11B shows the image data disposed in the application program.

DESCRIPTION OF THE EMBODIMENT

Figure 1:
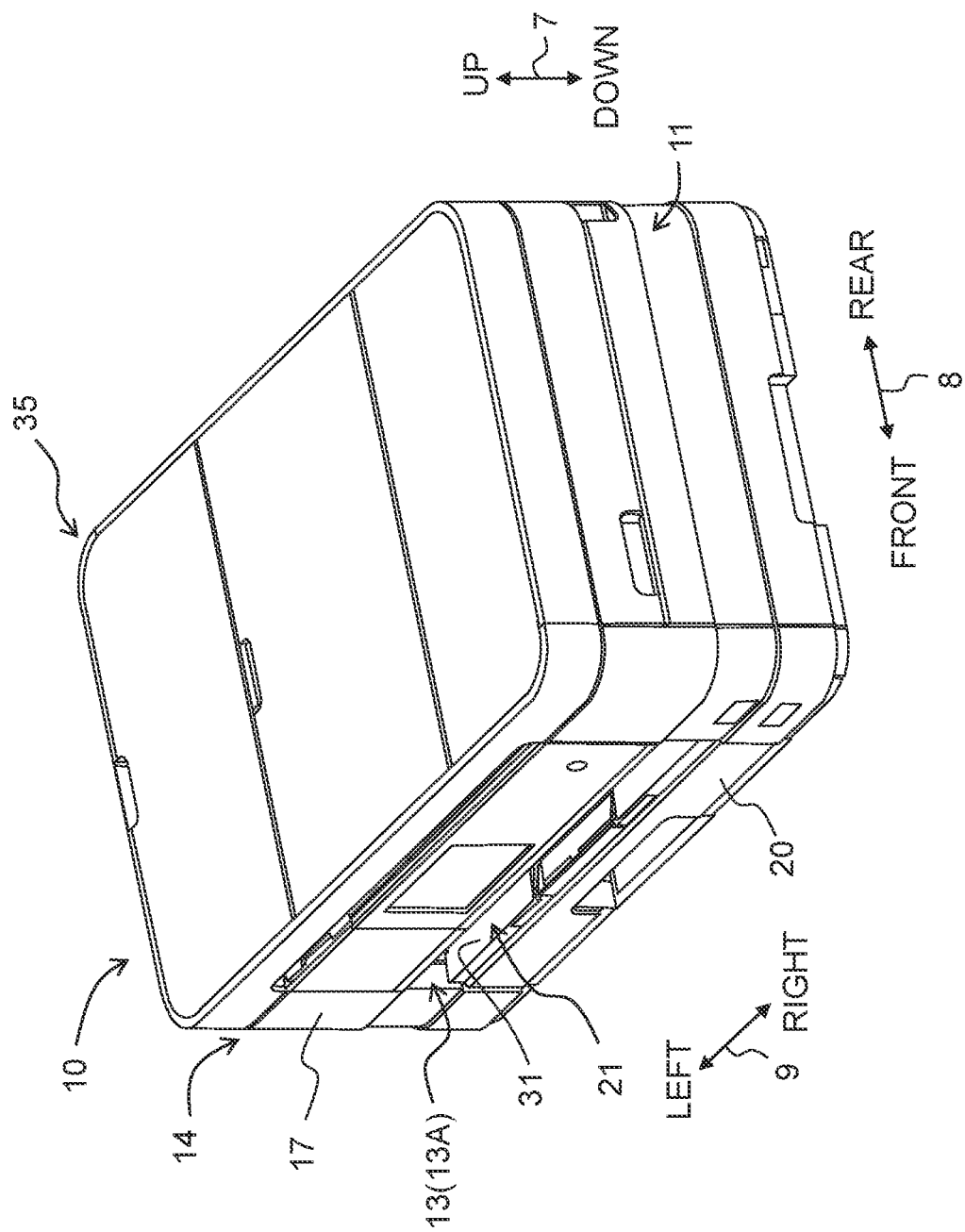
FIG. 1 is an outline view of a printer 10 according to an embodiment of the present invention.

Hereinbelow, referring to the accompanied drawings, an embodiment of the present disclosure will be explained. Note that the embodiment described below is one example of the present disclosure. It is possible to change the embodiment of the present disclosure without departing from the scope and true spirit of the present disclosure. In the following explanation, directions will be defined in reference to a printer 10 depicted in FIG. 1. For the printer 10, with the surface where an opening 13 is provided as the near side (or front surface 17), a front/rear direction 8 is defined; as viewed from the near side, a left/right direction 9 is defined, and an up/down direction 7 is defined.

[Configuration of the Printer 10]

In FIG. 1, the printer 10 is an example of image processing apparatuses, having a plurality of functions including a printing function and a scanning function. The printer 10 is provided with a casing 14 having an approximately cubic outer shape. The printer 10 is provided with a scanner unit 35 having the scanning function in an upper portion of the casing 14, and a printer unit 11 in a lower portion of the casing 14.

Figure 2:
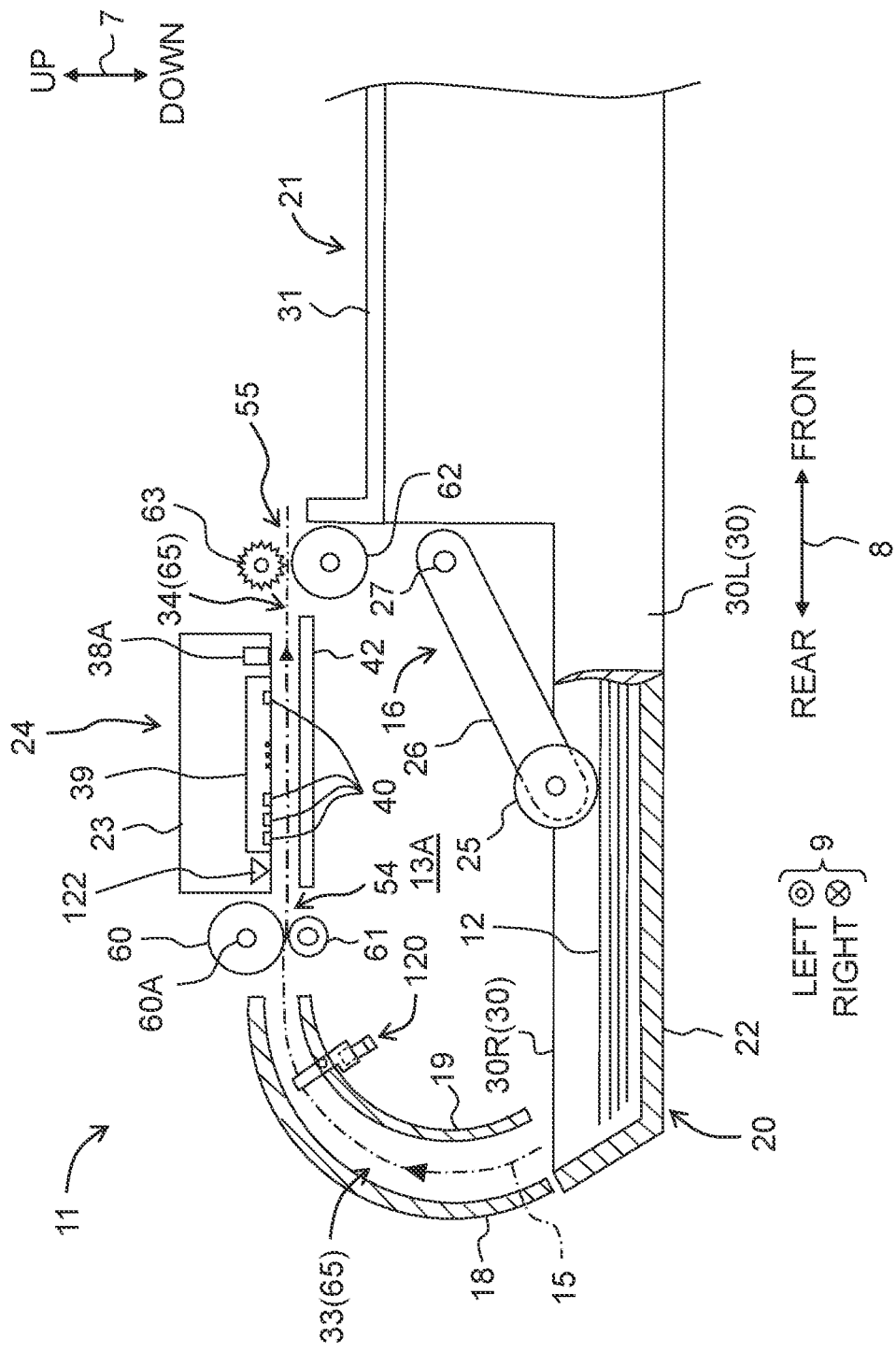
FIG. 2 is a cross section view showing an internal structure of a printer unit 11.

As depicted in FIG. 2, the printer unit 11 is provided with a supply tray 20, a discharge tray 21, a (recording medium) feeding mechanism 16, a conveyance path 65, a conveyance roller pair 54, a platen 42, a recording head 24, and a discharge roller pair 55.

[The Supply Tray 20]

Figure 3:
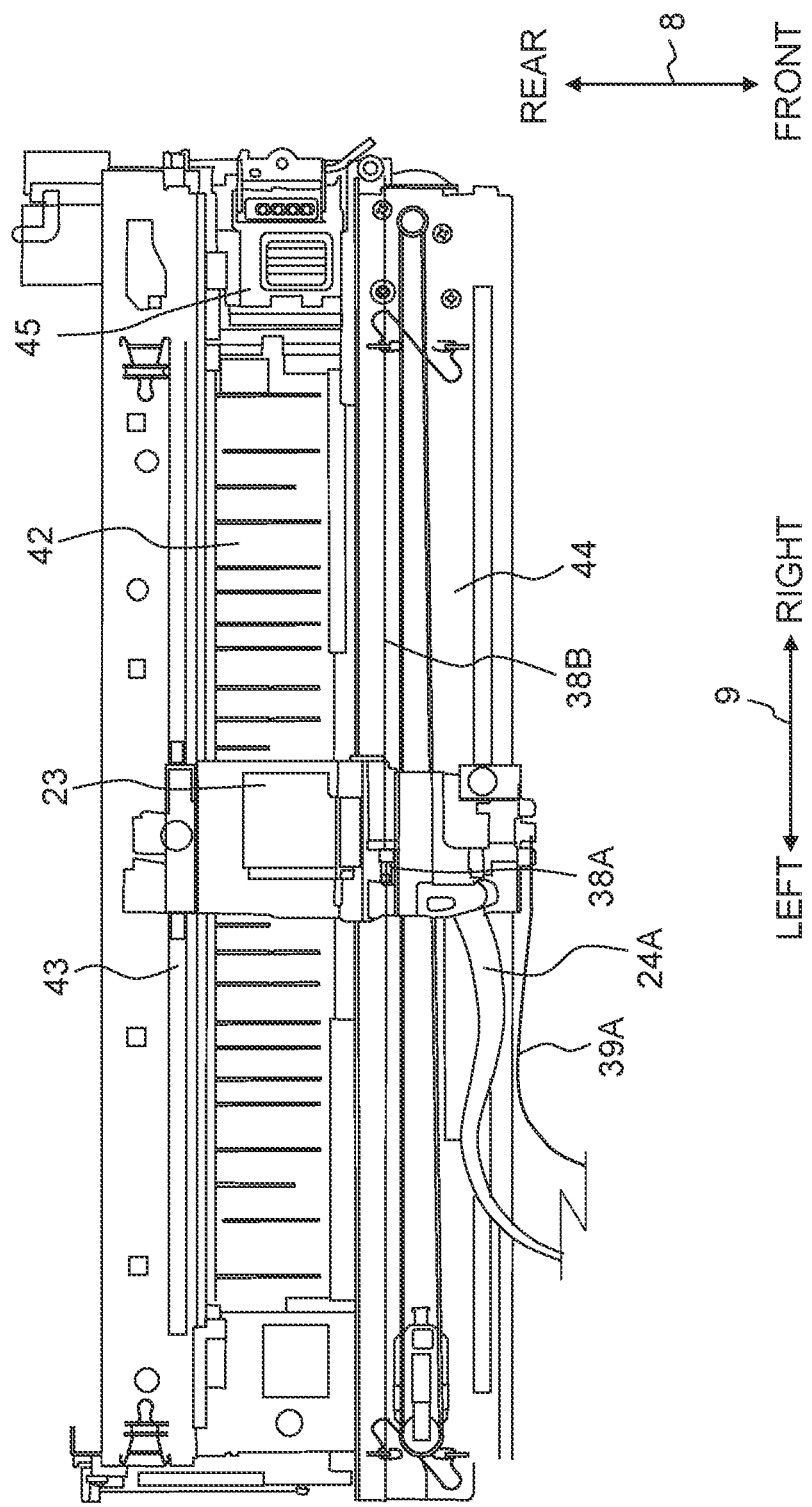
FIG. 3 is a plan view of a carriage 23 and guide rails 43 and 44.

As depicted in FIG. 1, the opening 13 is formed in the front surface 17 of the casing 14. The opening 13 is open to the front side of the casing 14. Inside the casing 14, as depicted in FIG. 2, an inner space 13A is formed. The inner space 13A is in communication with the outer space of the casing 14 through the opening 13. The supply tray 20 is configured to be installable into and removable from the inner space 13A through the opening 13. FIGS. 2 and 3 show the supply tray 20 in the installed position.

The supply tray 20 has a shallow box shape in the up/down direction 7. Further, as depicted in FIG. 2, the supply tray 20 has such a part sided with the rear end as open to the upper side. The supply tray 20 includes a bottom wall 22, and a pair of lateral walls 30. The bottom wall 22 supports a plurality of (recording medium) sheets 12 in a stacked state. In the stacked state, the recording surface of each sheet 12 is facing the bottom wall 22 (that is, the lower side). Note that the pair of lateral walls 30 includes a left wall 30L and a right wall 30R. Further, the sheets 12 are an example of recording media.

[The Discharge Tray 21]

In FIGS. 1 and 2, the discharge tray 21 supports, on an upper surface 31, the sheets 12 whose recording surfaces are recorded with images. The discharge tray 21 is formed integrally with the supply tray 20 and provided on the upper surface of the same in the shallow box shape.

[The Feeding Mechanism 16]

As depicted in FIG. 2, the feeding mechanism 16 is provided with a feeding roller 25 and a feeding arm 26. The feeding roller 25 is supported by the leading end of the feeding arm 26 in a rotatable manner. The rear end of the feeding arm 26 is supported by the frame of the casing 14 in a revolvable manner around a support shaft 27. A drive force transmitting mechanism (not depicted) is accommodated in the feeding arm 26. The drive force transmitting mechanism includes either a plurality of gears or an endless belt to transmit the drive force of a conveyance motor 102 (see FIG. 4) to the feeding roller 25. By virtue of this, the feeding roller 25 rotates forward to feed the upmost one of the sheets 12 supported by the bottom wall 22 to the conveyance path 65. A downward force is applied on the leading end of the feeding arm 26 by its own weight of the feeding arm 26 or a biasing force due to a spring or the like. By virtue of this, the feeding roller 25 presses the sheets 12 on the bottom wall 22 downwardly.

[The Conveyance Path 65]

As depicted in FIG. 2, in the casing 14, the conveyance path 65 extends from the rear end of the supply tray 20. The conveyance path 65 has a U-shape for conveying the sheets 12. The width of the conveyance path 65 in the left/right direction 9 is a little larger than the maximum width of the sheets 12 supported by the supply tray 20. The conveyance path 65 has a curved portion 33 and a linear portion 34. The curved portion 33 extends upward from the rear end of the supply tray 20 in the installed position, and extends on frontward. The linear portion 34 is in continuity with the downstream end of the curved portion 33, and approximately linearly extends frontward from the downstream end of the curved portion 33 to the rear end of the discharge tray 21. The curved portion 33 is formed from an outer guide member 18 and an inner guide member 19. The recording head 24 is arranged above the linear portion 34 whereas the platen 42 is arranged below the linear portion 34.

In FIG. 2, the sheets 12 are conveyed through the conveyance path 65 in a conveyance direction 15 depicted with a dotted chain line. In detail, in the curved portion 33, the sheets 12 are conveyed to the conveyance roller pair 54 while being guided chiefly by the outer guide member 18. The sheets 12 are nipped by the rotating conveyance roller pair 54 and conveyed frontward with the recording surfaces facing upward. In the linear portion 34, the sheets 12 are supported by the upper surface of the platen 42 while passing right below the recording head 24. During this period, ink is discharged from the recording head 24 onto the recording surfaces of the sheets 12. As a result, images are recorded on the recording surfaces. Then, the sheets 12 are conveyed to the discharge roller pair 55. The sheets 12 are nipped by the rotating discharge roller pair 55 and discharged to the upper surface 31 of the discharge tray 21 at the front side of the discharge roller pair 55.

[The Conveyance Roller Pair 54]

As depicted in FIG. 2, the conveyance roller pair 54 is positioned at the downstream end of the curved portion 33 (that is, the upstream end of the linear portion 34). The conveyance roller pair 54 includes a conveyance roller 60 and a pinch roller 61. The conveyance roller 60 extends in the left/right direction 9 along the conveyance path 65 above the conveyance path 65. The conveyance roller 60 is caused to rotate in a positive or forward direction by the drive force generated by the conveyance motor 102 (see FIG. 4). The pinch roller 61 is in contact with the conveyance roller 60 from below to be driven to rotate by the rotation of the conveyance roller 60. Each of the sheets 12 is nipped by the conveyance roller 60 in forward rotation and the pinch roller 61 in driven rotation, to be conveyed in the conveyance direction 15. Note that the conveyance roller pair 54 is part of the conveyor.

[Resist Sensor 120]

Figure 4:
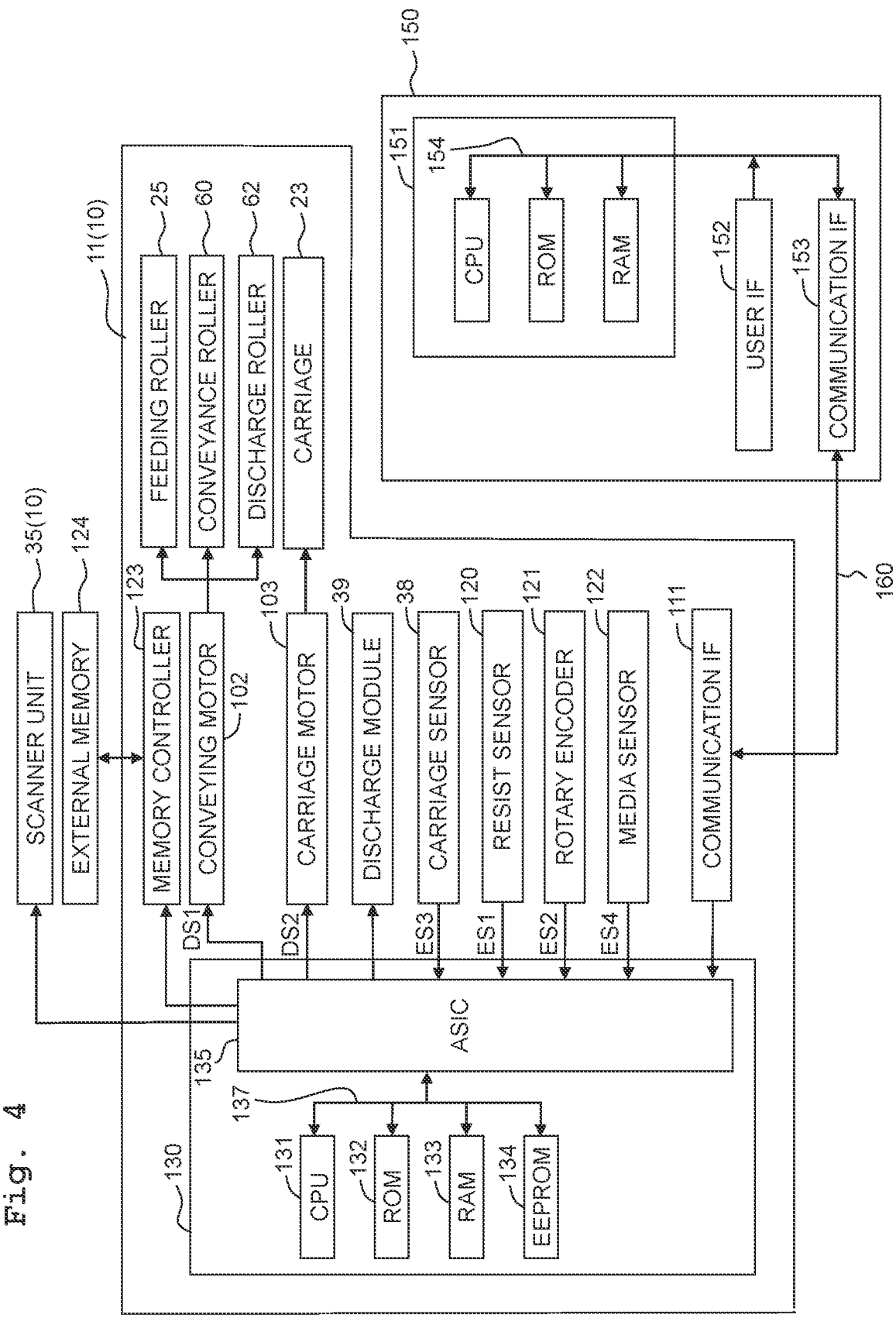
FIG. 4 is a block diagram of the printer 10.

As depicted in FIG. 2, a resist sensor 120 (an example of a sensor of the present disclosure) is provided in a resist position in the vicinity of the downstream end of the curved portion 33. The resist sensor 120 is supported by the inner guide member 19 to extend out to the curved portion 33. The resist sensor 120 is in contact with the sheet 12 being conveyed in the curved portion 33. As depicted in FIG. 4, the resist sensor 120 outputs to the controller 130 an electrical signal ES1 having a level corresponding to the contact force applied by the sheet 12. The electrical signal ES1 shows whether or not there is any sheet 12 in the resist position.

[Rotary Encoder 121]

In FIG. 2, the conveyance roller 60 is supported by the casing 14 (see FIG. 1) via a shaft 60A rotating around its own shaft center. A rotary encoder 121 (see FIG. 4) is provided in the vicinity of the shaft 60A. The rotary encoder 121 has an encoder disk and an encoder sensor. The encoder disk is fitted on the shaft 60A to rotate together with the shaft 60A. The encoder disk is provided to be concentrically with the shaft center of the shaft 60A. At the circumferential end of the encoder disk, transmission portions for transmitting light and block portions for blocking light are arranged at certain intervals alternately. The encoder sensor includes light emitting elements and light receiving elements. The rotary encoder 121 emits light from the light emitting elements toward the interspaces through which the light of the rotating encoder disk transmits. The light receiving elements face the light emitting elements across the encoder disk, and can receive the emitted light from the light emitting elements. As depicted in FIG. 4, the rotary encoder 121 outputs an electrical signal ES2 corresponding to the intensity of the received light to the controller 130 from the light receiving elements. The electrical signal ES2 is a pulse signal showing the number of rotations of the conveyance roller 60.

[The Platen 42]

In FIGS. 2 and 3, the platen 42 has a support surface (see FIG. 3) extending in the front/rear direction 8 and the left/right direction 9 right below the linear portion 34, in a position between the conveyance roller pair 54 and the discharge roller pair 55 in the conveyance direction 15 (see FIG. 2). The support surface of the platen 42 is positioned along the lower side of the linear portion 34 (see FIG. 2). Further, the support surface of the platen 42 has a smaller optical reflectance than the sheets 12 because of being colored in black, for example.

[The Recording Head 24]

As depicted in FIG. 2, the recording head 24 is separated upward from the platen 42 and is provided with a carriage 23, a discharge module 39, an encoder sensor 38A, and a media sensor 122. The discharge module 39, the encoder sensor 38A, and the media sensor 122 are connected in a communicable manner with the controller 130 (see FIG. 4) through a flexible flat cable 24A (see FIG. 3). Further, the discharge module 39 is connected in a fluid-communicable manner with an ink container (not depicted) such as an ink tank, an ink cartridge or the like, through an ink tube 39A (see FIG. 3).

The carriage 23 is, as depicted in FIG. 3, supported by the two guide rails 43 and 44 in pair. The guide rails 43 and 44 extend in the left/right direction 9 along the platen 42 in positions separated from each other across the platen 42. The carriage 23 is placed over on the guide rails 43 and 44 and, due to a drive force transmitted from a belt conveyor, moves in the left/right direction 9 along the guide rails 43 and 44.

The belt conveyor includes, approximately speaking, two pulleys and an endless belt. The two pulleys are separated from each other in the left/right direction 9 on the guide rail 44. The endless belt is stretched on the two pulleys and connected to the carriage 23. One of the two pulleys receives the drive force generated by the carriage motor 103 (see FIG. 4). The other pulley rotates in a forward direction or a backward direction such that the endless belt transmits the drive force along the left/right direction 9 to the carriage 23, which is then caused to move reciprocatingly in the left/right direction 9 between the two pulleys. In detail, if the carriage motor 103 is in forward rotation, then the carriage 23 moves leftward, whereas if the carriage motor 103 is in backward rotation, then the carriage 23 moves rightward.

As depicted in FIG. 2, the discharge module 39 is fitted in a lower portion of the carriage 23. In the lower surface of the discharge module 39, a plurality of discharge openings or nozzles 40 are formed. Under the control of the controller 130, the discharge module 39 discharges the ink supplied from the ink container (not depicted) through the ink tube 39A in the course of the carriage 23 moving either leftward or rightward. By virtue of this, images are recorded on the recording surfaces of the sheets 12.

On the guide rail 44, an encoder strip 38B is provided to extend in the left/right direction 9. The carriage sensor 38 includes the encoder sensor 38A and the encoder strip 38B. The encoder sensor 38A is mounted on the carriage 23 to face the encoder strip 38B at the front end or the rear end of the encoder strip 38B. The encoder sensor 38A includes light emitting elements and light receiving elements. The encoder sensor 38A emits light from the light emitting elements to the encoder strip 38B in the course of the carriage 23 moving reciprocatingly. The encoder sensor 38A receives the reflected light from the encoder strip 38B with the light receiving elements. The carriage sensor 38 outputs an electrical signal ES3 (see FIG. 4) corresponding to the intensity of the received light to the controller 130 from the light receiving elements. The electrical signal ES3 shows the position of the carriage 23 in the left/right direction 9.

[The Discharge Roller Pair 55]

In FIG. 2, the discharge roller pair 55 is positioned in the vicinity of the downstream end of the linear portion 34. The discharge roller pair 55 includes a discharge roller 62 and a spur 63. The discharge roller 62 extends in the left/right direction 9 along the conveyance path 65 below the conveyance path 65. The discharge roller 62 rotates in a forward direction due to the drive force generated by the conveyance motor 102 (see FIG. 4). The spur 63 is in contact with the discharge roller 62 from above to be driven to rotate by the rotation of the discharge roller 62. Each of the sheets 12 is nipped by the discharge roller 62 in forward rotation and the spur 63 in driven rotation, to be conveyed in the conveyance direction 15. Note that the discharge roller pair 55 is part of the conveyor.

[The Media Sensor 122]

In FIG. 2, the media sensor 122 is fitted on the lower surface of the carriage 23 (the surface facing the recording head 24). The media sensor 122 includes light emitting elements and light receiving elements. The media sensor 122 emits light at a predetermined intensity downward from the light emitting elements. The media sensor 122 receives the reflected light from the platen 42 or the sheets 12 with the light receiving elements, and outputs an electrical signal ES4 (see FIG. 4) corresponding to the intensity of the received light to the controller 130. The electrical signal ES4 shows whether or not there is any sheet 12 on the platen 42. The media sensor 122 is an example of sensors.

<Electric Configuration of a System 1>

In FIG. 4, a system 1 includes the printer 10 and at least one external processing device 150. The printer 10 and the external processing device 150 are capable of data communication with each other through a data transmission path 160. The data transmission path 160 is a network constructed of a wired LAN, wireless LAN, WAN, or from a combination thereof. Alternatively, the data transmission path 160 may be a USB cable. Note that the printer 10 may be a device which can at least receive the data from the external processing device 150. Hereinbelow, explanations will be made in order on specific configurations of the printer 10 and the external processing device 150.

[Communication Interface 111]

As depicted in FIG. 4, the printer 10 is provided with a communication interface 111 (to be also referred to below as "communication IF"). The communication IF 111 is an interface for carrying out data communication with the external processing device 150 through the data transmission path 160.

[The Controller 130]

As depicted in FIG. 4, the controller 130 includes a CPU 131, a ROM 132, a RAM 133, an EEPRAM 134, and an ASIC 135, all of which are connected via an internal bus 137. The ROM 132 stores programs and the like for controlling the operation of the printer 10. The CPU 131 uses the RAM 133 and the EEPRAM 134 to execute the programs.

The ASIC 135 is connected electrically with the conveyance motor 102 and the carriage motor 103. The ASIC 135 generates drive signals DS1 and DS2 for rotating the conveyance motor 102 and the carriage motor 103 and outputting the same to the conveyance motor 102 and the carriage motor 103, respectively. The ASIC 135 is connected electrically with the resist sensor 120, the rotary encoder 121, the carriage sensor 38, and the media sensor 122, to receive the electrical signals ES1, ES2, ES3 and ES4 respectively.

Further, the ASIC 135 causes the RAM 133 or the EEPRAM 134 to store the image data acquired by a memory controller 123. The memory controller 123 is a communication port which reads or writes data for an external memory 124. The external memory 124 is a device having a memory function such as a memory card, a USB memory, a portable storage, a digital camera, or the like.

The ASIC 135 sends data to the discharge module 39 for the recording. The data for the recording are, for example, path data D1 to D6 depicted in FIG. 6C. The discharge module 39 discharges the ink from the discharge openings 40 of the discharge module 39 on the basis of those data for the recording. By virtue of this, recording is carried out on the recording surfaces of the sheets 12. Further, the ASIC 135 causes the RAM 133 or the EEPRAM 134 to store the images acquired by the scanner unit 35.

[The External Processing Device 150]

As depicted in FIG. 4, the external processing device 150 is, for example, a personal computer, a smartphone, or a tablet terminal device, and also includes an external storage device such as a server or the like. The external processing device 150 includes an external controller 151, a user interface 152 (to be also referred to below as "user IF"), and a communication IF 153. The external controller 151 includes a CPU, a ROM, a RAM, and the like.

The user IF 152 includes a display, a mouse, and the like. The display is a liquid crystal display, an organic EL display or the like, for displaying various kinds of information. The mouse is used to accept inputs from a user. The external controller 151, the user IF 152, and the communication IF 153 are connected with each other in a communicable manner via an internal bus 154. Note that the external controller 151, the communication IF 153, and the internal bus 154 are configured in the same manner as the controller 130, the communication IF 111, and the internal bus 137, respectively; hence explanation for each of those members will be omitted.

[Process for Generating the Recording Data]

Figure 5:
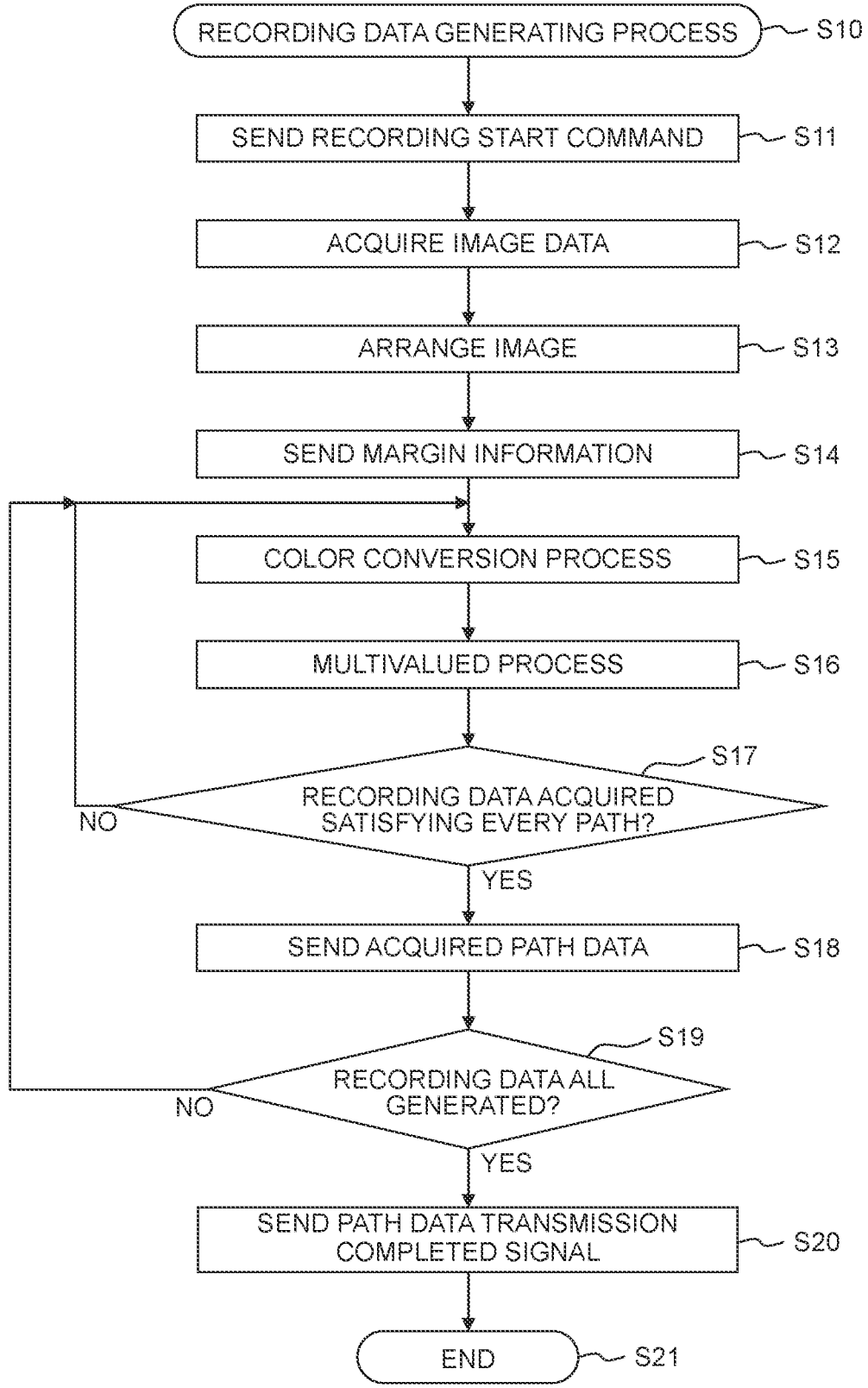
FIG. 5 is a flow chart of a recording data generating process.

Referring to FIGS. 5 and 6A to 6C, explanation will be made on a process for the external processing device 150 to generate the recording data. The external controller 151 executes a program stored in its own ROM (a printer driver or the like) to carry out the process for generating the recording data as depicted in FIG. 5. The external controller 151 starts the process for generating the recording data by accepting an operation of a print execution button depicted on the display via the mouse of the user IF 152 (step S10).

In the step S11, the external controller 151 sends a recording start command to the printer 10. Further, the external controller 151 sends part of a condition data set by the user to the printer 10 along with the recording start command. For example, the condition data sent in the above includes information showing image quality and recording speed. Having received the recording start command, the printer 10 starts the recording process. The recording process will be explained in detail later on.

In the steps S12, the external controller 151 acquires an image data G and a condition data. The image data may be read out from the data stored in the RAM of the external controller 151 or the like. The image data G read out is depicted in FIG. 6A. The image data G is the original data before being processed for the recording object, and for being displayed on a display or the like and expressed by an RGB color model or the like. The condition data includes information such as a front edge margin FL and a left end margin LBL showing in which position of the sheets 12 as the recording object the image data G should be arranged, a paper size A1 (see FIG. 6A), expansion of the image, contraction of the image, and the like.

In the step S13, the external controller 151 determines an arrangement of the image data G for the consumed paper size A1 on the basis of the acquired information about the front edge margin FL, the left end margin LBL, the paper size A1, and the expansion and contraction of the image. On this occasion, a tail edge margin RL and a right end margin RBL are determined. FIG. 6B shows that the image data G is arranged in the paper size A1. The front edge margin FL is the distance from the paper front edge SF of the paper size A1 to the front edge of the image data G in the conveyance direction 15. The left end margin LBL is the distance from the left end of the paper size A1 to the left end of the image data G in the conveyance direction 15. The right end margin RBL is the distance from the right end of the paper size A1 to the right end of the image data G in the conveyance direction 15. The tail edge margin RL is the distance from the paper tail edge SB of the paper size A1 to the tail edge of the image data G in the conveyance direction 15.

In the step S14, the external controller 151 sends to the printer 10 the front edge margin FL, the left end margin LBL, the tail edge margin RL, and the right end margin RBL as part of the condition data.

The external controller 151 carries out a color conversion process for the image data G in the step S15. The color conversion process is to convert the data expressed by the RGB color model or the like to a data expressed by a CMYK color model. The RGB color model is expressed by (R100, G25, B48), for example. The numerals show the color gradation expressed in 256 levels from 0 to 255, indicating R=red, G=green, and B=blue. The CMYK color model is expressed by (C20, M255, Y125, K13), for example. The numerals show the color gradation expressed in 256 levels from 0 to 255, indicating C=cyan, M=magenta. Y=yellow, and K=black.

The external controller 151 carries out a multivalued process for the image data G in the step S16. The multivalued process is to convert the data expressed by the CMYK color model to a recording data expressed in dot size for each color of CMYK to discharge. The recording data is expressed by (C01, M11, Y10, K00), for example. The recording data shows the dot size expressed in binary number according to each color. The dot size is set for each dot according to the print resolution. The dot size is set to any one of the following: 00=no discharge, 01=small dot, 10=medium dot, and 11=large dot. The example depicted here illustrates the dot size in two bits. However, if the dot size is expressed in three bits, then it can be classified in more detailed level.

As depicted in FIG. 6B, the image data G has white dots Wh and black dots Bk. The white dots Wh indicate positions on which the inks are not discharged. The white dots Wh are expressed by (C00, M00, Y00, K00) in the recording data to form the dots where any of the inks of C, M, Y and K is not discharged. The black dots Bk are expressed by (C00, M00, Y00, K11) for example to form the dots where C. M and Y are not discharged but K is discharged in large dots.

In the step S17, the external controller 151 confirms whether or not the recording data is acquired to satisfy every path. If it cannot yet be acquired (S17: No), then the process returns to the step S15. If it is acquired (S17: Yes), then the process proceeds to the step S19. In the case of (S17: No), the external controller 151 carries out the color conversion process of the step S15 to covert the image data to the recording data, and the multivalued process of the step S16, in the order from the front edge to the tail edge of the image data in the conveyance direction. The external controller 151 determines a Yes for the step S17 if the recording data is generated for the discharge module 39 to discharge through one path.

Figure 6C:
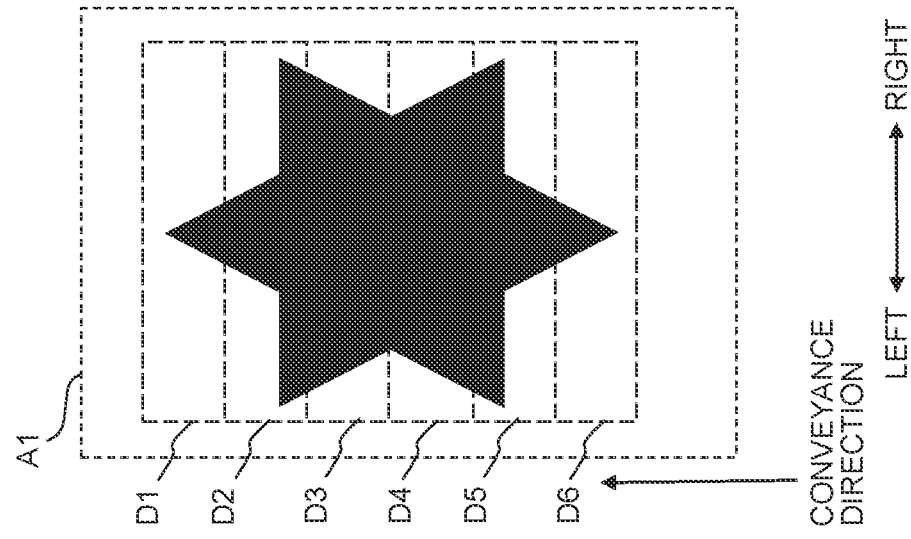
FIG. 6C is drawn for explanation of generating a path data.
Figure 6B:
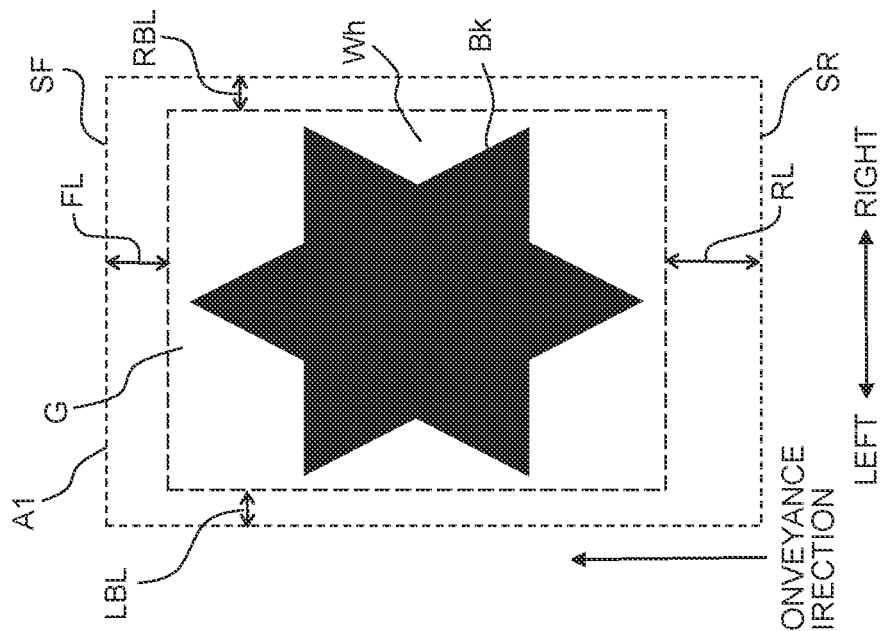
FIG. 6B shows an arrangement of the image data.
Figure 6A:
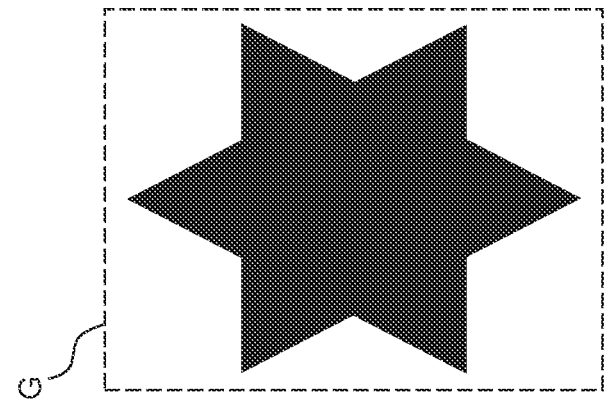
FIG. 6A shows an image data.
Figure 7A:
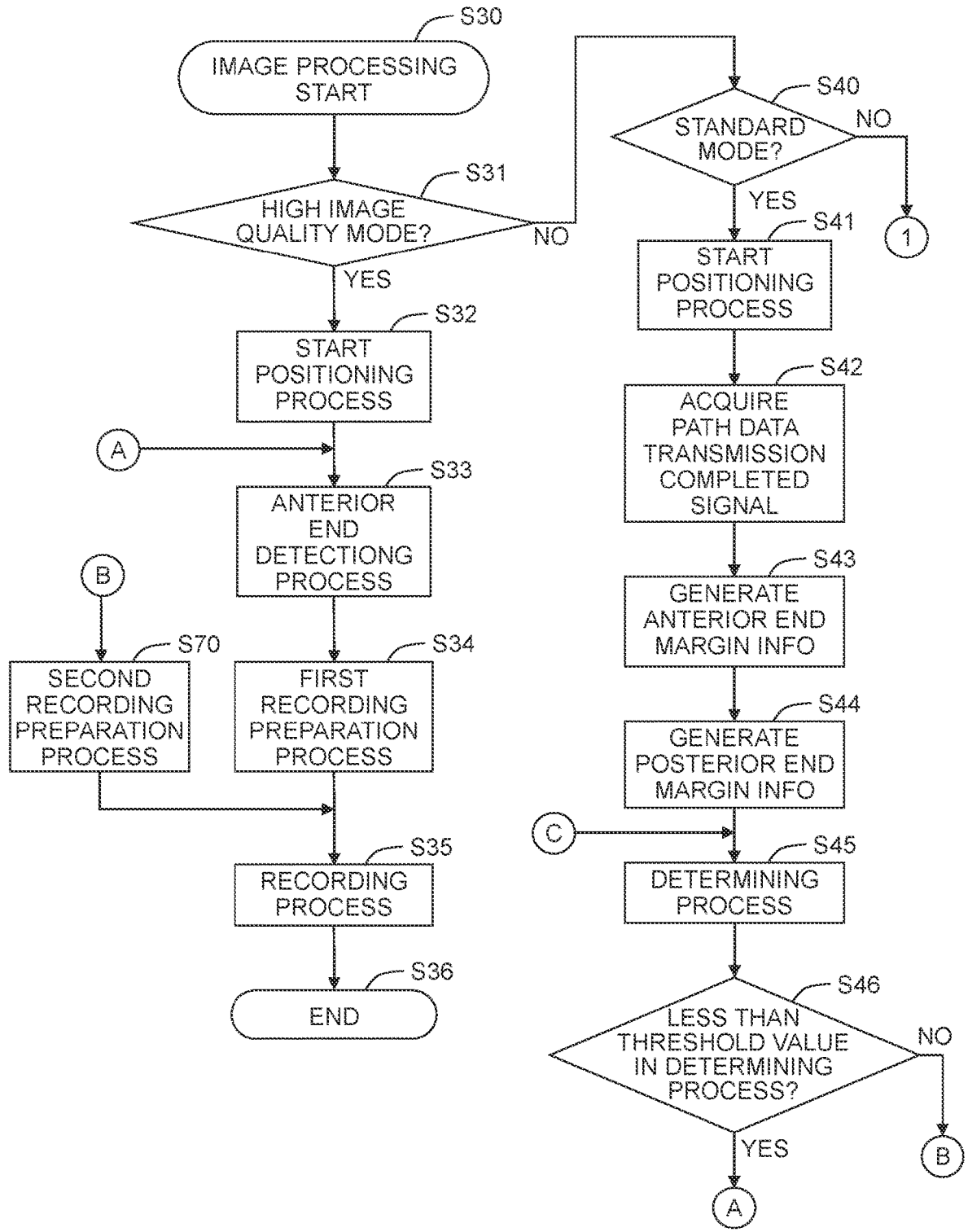
FIGS. 7A and 7B depict a flow chart of an image processing.
Figure 7B:
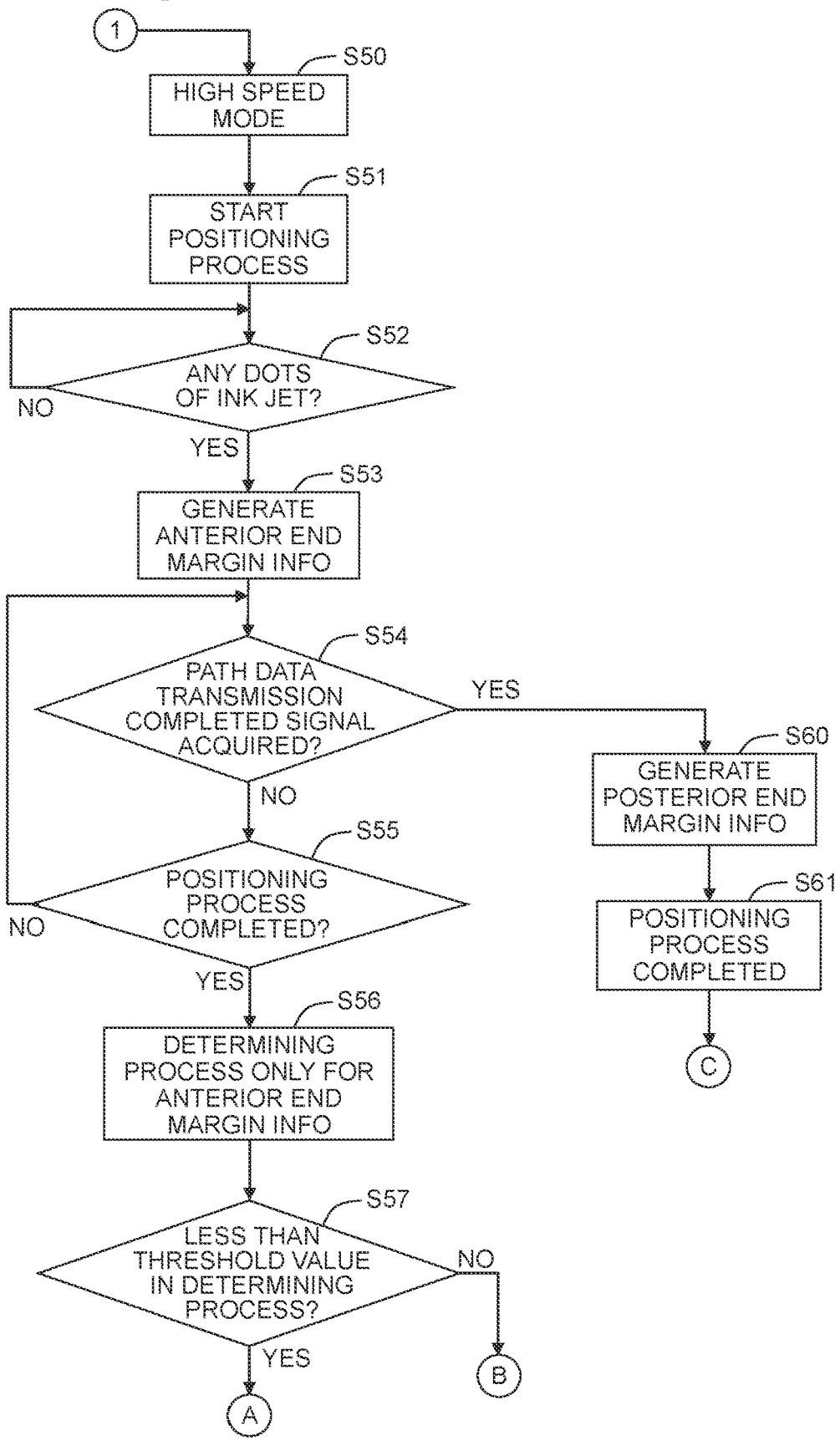

In the step S18, the external controller 151 sends the generated recording data to the printer 10 as the path data D1 depicted in FIG. 6C. The path data D1 to D6 are sent to the printer 10 in order according to each repetition of the step S18.

In the step S19, the external controller 151 determines whether or not all recording data are generated. If all recording data are not yet generated (S19: No), then the process returns to the step S15. If all recording data are generated (S19: Yes), then the last recording data is sent to the printer 10 as the path data, and the process proceeds to the step S20.

In the step S20, the external controller 151 sends a signal to the printer 10 to inform the same that transmission of the path data is finished. With that, the recording data generating process is ended.

[Recording Process]

Referring to FIG. 2 and FIGS. 6A to 10B, explanation will be made on a recording process carried out by the printer 10. By executing a program stored in its own ROM, the controller 130 carries out the recording process depicted in FIGS. 7A and 7B. The controller 130 receives the recording start command and part of the condition data sent by the external processing device 150. That is, the controller 130 acquires the recording data for the discharge module 39 to record on the sheets 12, the front edge margin FL showing the margin in a closer position to the front edge than the position where the ink is discharged first in the conveyance direction 15, and the tail edge margin RL showing the margin in a closer position to the tail edge than the position where the ink is discharged last in the conveyance direction 15, on the sheet 12 in the conveyance direction 15. In other words, the controller 130 acquires the front edge margin showing the margin in a downstream position of the image on the sheet 12 in the conveyance direction 15, and the tail edge margin showing the margin in an upstream position of the image in the conveyance direction 15. On receiving the recording start command, the controller 130 starts the recording process (S30). The acquired condition data is stored in the EEPRAM 134.

In the step S31, the controller 130 reads out the information indicating the image quality and recording speed from the condition data stored in the EEPRAM 134. On this occasion, it is determined whether or not the information indicating the image quality and recording speed is of a high image quality mode. In the case of the high image quality mode (S31: Yes), then the process proceeds to the step 32. If it is not of the high image quality mode (S31: No), then the process proceeds to the step S40. The information indicating the image quality and recording speed is classified into the high image quality mode placing the priority on image quality, a high speed mode placing the priority on printing speed, and a standard mode other than the former two.

In the step S32, the controller 130 starts a positioning process. The controller 130 drives the feeding roller 25 depicted in FIG. 2 to send out the topmost sheet in the plurality of sheets 12 stacked on the supply tray 20, in the conveyance direction 15. The sheet 12 sent out is guided by the outer guide member 18 and the inner guide member 19, comes to contact with the resist sensor 120, and then reaches the conveyance roller pair 54. On this occasion, the conveyance roller pair 54 has stopped its rotation such that the front edge of the sheet 12 in the conveyance direction 15 comes to a stop at the upstream of the discharge module 39 in the conveyance direction 15. That is, it is nipped between the conveyance roller 60 and the pinch roller 61 and comes to the stop. In other words, the controller 130 positions the sheet 12 to a predetermined place with respect to the discharge module 39 in the conveyance direction 15 in the positioning process.

Figure 8:
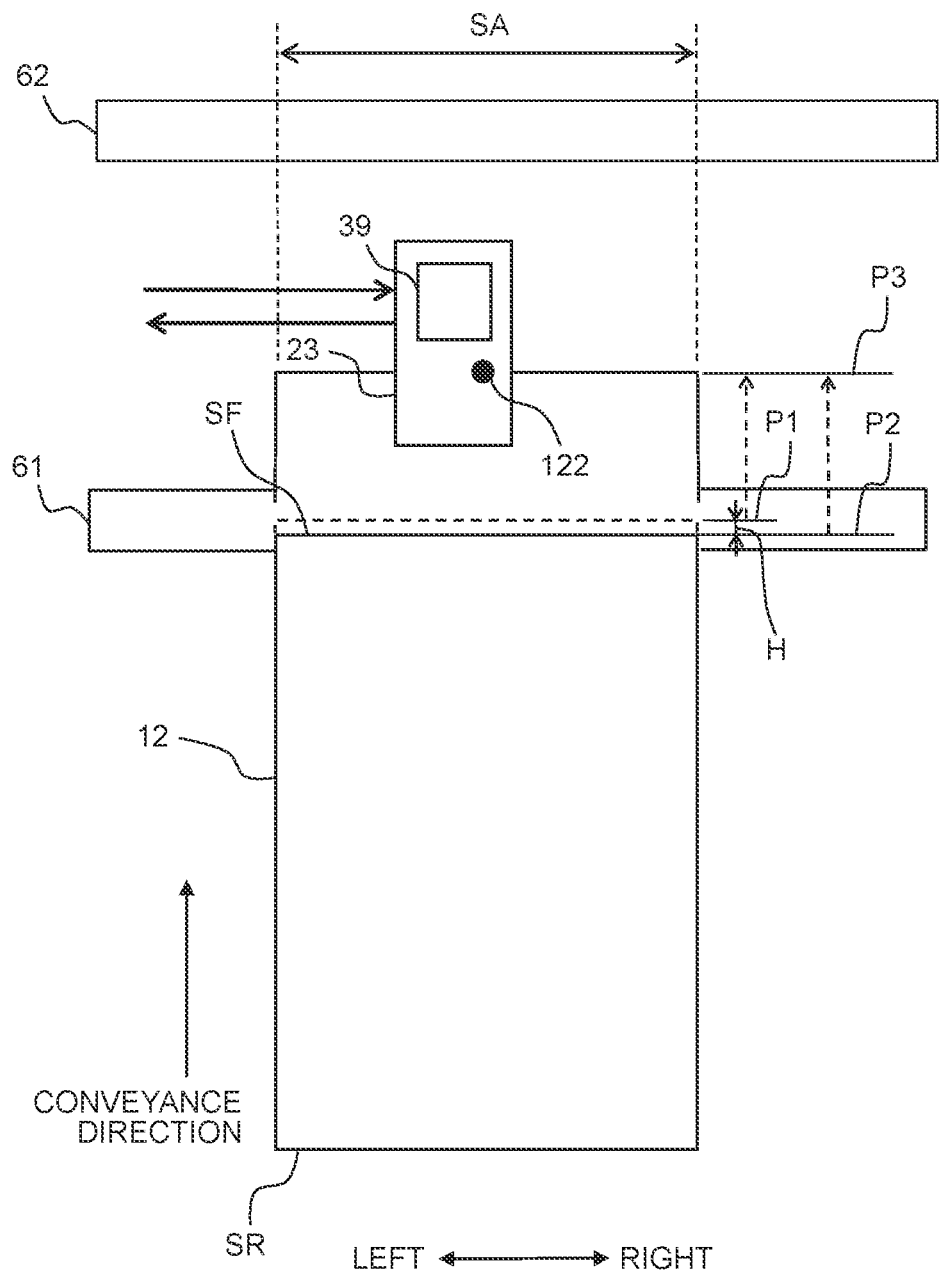
FIG. 8 is drawn for explanation of an front edge detecting process.

FIG. 8 shows a sheet 12 after the positioning process is ended. The positioning process is to operate the printer to position the paper front edge SF of the sheet 12 in the conveyance direction 15 to a stop position P1. However, the actual position of the paper front edge SF may deviate from the stop position P1 by a stop error H to be a stop position P2, not necessarily fitting thereto. That is, the stop position resulted from the positioning process includes the stop error H.

In the step S33, the controller 130 first confirms that the positioning process is completed and then carries out a front edge detecting process. Referring to FIG. 8, an explanation will be made on the front edge detecting process in detail. The controller 130 causes the carriage 23 to move such that the media sensor 122 may be positioned in a paper conveyance path SA where the paper is conveyed (in the case of being already positioned there, there is no need to move the carriage 23). Then, the controller 130 causes the conveyance roller 60 depicted in FIG. 2 to rotate for conveying the sheet 12 nipped by the conveyance roller 60 and the pinch roller 61, in the conveyance direction 15. After the media sensor 122 detects the paper front edge SF of the sheet 12 conveyed in the conveyance direction 15 at a stop position P3, the controller 130 causes the conveyance roller 60 to stop rotating. That is, in the front edge detecting process, the controller 130 first causes the carriage 23 to move such that the media sensor 122 may be positioned in the paper conveyance path SA where the sheets 12 are conveyed, and then causes the conveyance roller 60 to convey the sheet 12 in the conveyance direction 15 to the stop position P3 where the media sensor 122 outputs a detecting signal, from the stop position P1 or the stop position P2. Along with the stop of the conveyance roller 60, the sheet 12 nipped by the conveyance roller 60 and the pinch roller 61 comes to a stop.

That is, the controller 130 causes the printer to operate to convey the sheet 12, moving the paper front edge SF from the stop position P1 to the stop position P3. However, in practice, the paper front edge SF is conveyed from the stop position P2 which deviates from the stop position P1 by the stop error H. On this occasion, because the actual stop position is the stop position P3 regardless of which position the conveyance is started from, the difference by the stop error H between the stop position P1 and the stop position P2 is cancelled. In this manner, the stop position of the sheets 12 resulted from the front edge detecting process has a higher precision in the stop position of the paper front edge SF than that of the sheets 12 resulted from the positioning process.

Figure 9A:
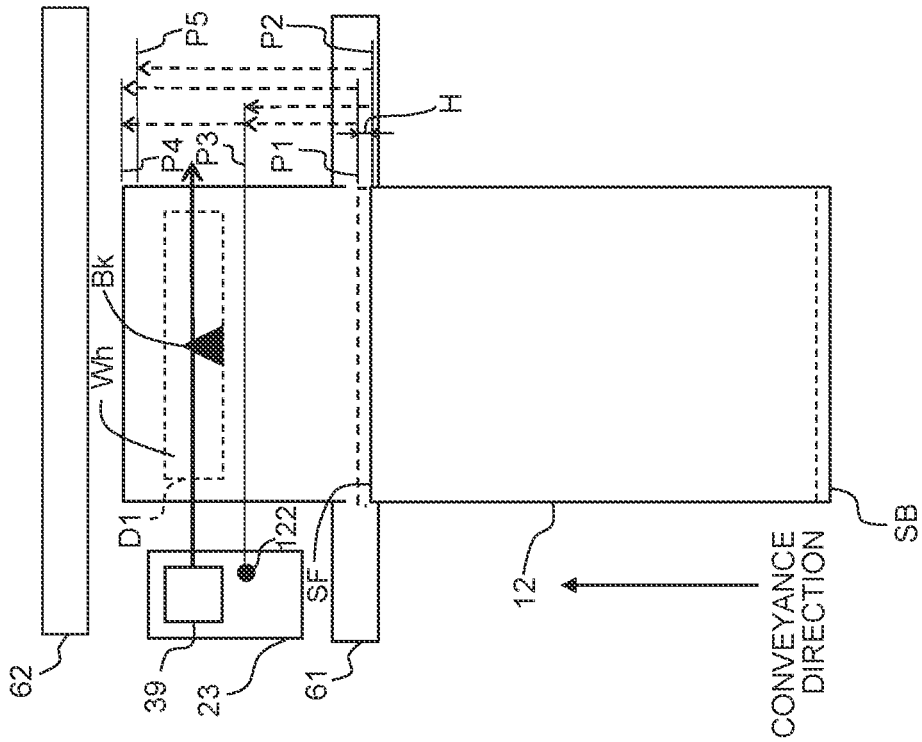
FIG. 9A is drawn for explanation of a first recording preparation process and a second recording preparation process.

In the step S34, the controller 130 carries out a first recording preparation process. The controller 130 causes the printer to convey the paper front edge SF from the stop position P3 to a stop position P4 which is the position for the discharge module 39 to record for first time on the sheet 12. Referring to FIG. 9A, a more detailed explanation will be made. The stop position P4 is the position where the paper size A1 for the path data D1 to fit into the position of the sheet 12 for the path data D1 depicted in FIGS. 9A to 9C. The paper front edge SF of the sheet 12 is conveyed up to the stop position P4 but, on this occasion, because the front edge detecting process is carried out in the step S33, the paper front edge SF is located in approximate agreement with the stop position P4.

In the step S35, the controller 130 carries out the recording process. Referring to FIG. 9A, a detailed explanation will be made therefor. First, the printer 10 receives the path data D1 to D6 in sequence. The controller 130 causes the RAM 133 or the EEPRAM 134 to store the received path data D1 to D6 in the received order. The controller 130 reads out the path data D1 for discharging the inks for the first time, and outputs the path data D1 to the discharge module 39 while moving the carriage in a rightward sheet direction depicted in FIGS. 9A to 9C. Based on the inputted path data D1, the discharge module 39 discharges ink. That is, the controller 130 carries out the recording process for the discharge module 39 discharging the ink to record on the sheets 12 based on the path data D1. For example, no ink is discharged for a white dot Wh whereas the ink K is discharged for a black dot Bk.

Figure 9B:
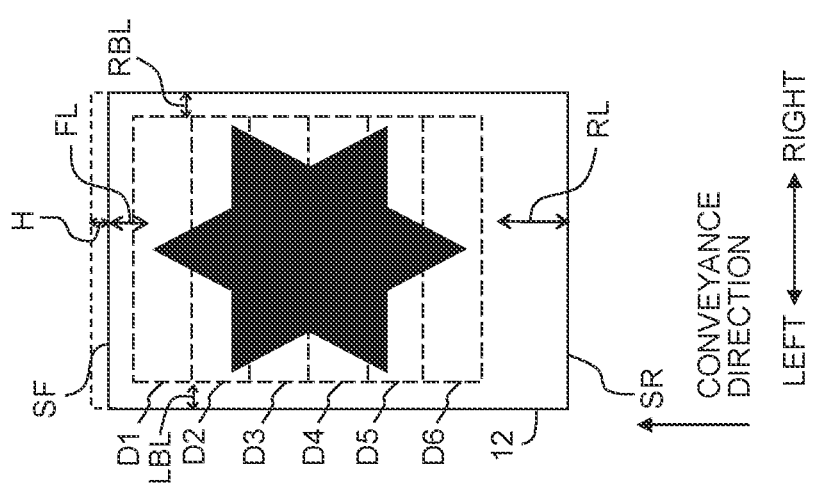
FIG. 9B shows a result of a recording process carried out after the front edge detecting process is carried out.

When the discharge module 39 is finished with the recording of the path data D1, the controller 130 conveys the sheet 12 to the recording position for the next path data D2. The controller 130 reads out the path data D2, and outputs the path data D2 to the discharge module 39 while moving the carriage in the rightward sheet direction depicted in FIGS. 9A to 9C. Based on the inputted path data D2, the discharge module 39 discharges the ink. Thereafter, the same process is carried out in sequence for the path data D3 to D6. FIG. 9B shows a sheet 12 which is finished with the recording process. With that, the image processing is ended (S36).

In the step S40, the controller 130 reads out the information indicating the image quality and recording speed from part of the condition data stored in the EEPRAM 134. On this occasion, it is determined whether or not the information indicating the image quality and recording speed is of the standard mode. In the case of the standard mode (S40: Yes), then the process proceeds to the step 41. If it is not of the standard mode (S40: No), then the process proceeds to the step S50.

The controller 130 carries out the positioning process in the step S41. Because the positioning process of the step S41 is the same as the step S32, explanation therefor will be omitted.

In the step S42, after confirming that the positioning process is finished, the controller 130 confirms whether or not the path data transmission completed signal sent by the external processing device 150 is received (or acquired). If it is received, then the process proceeds to the step S43.

Figure 10A:
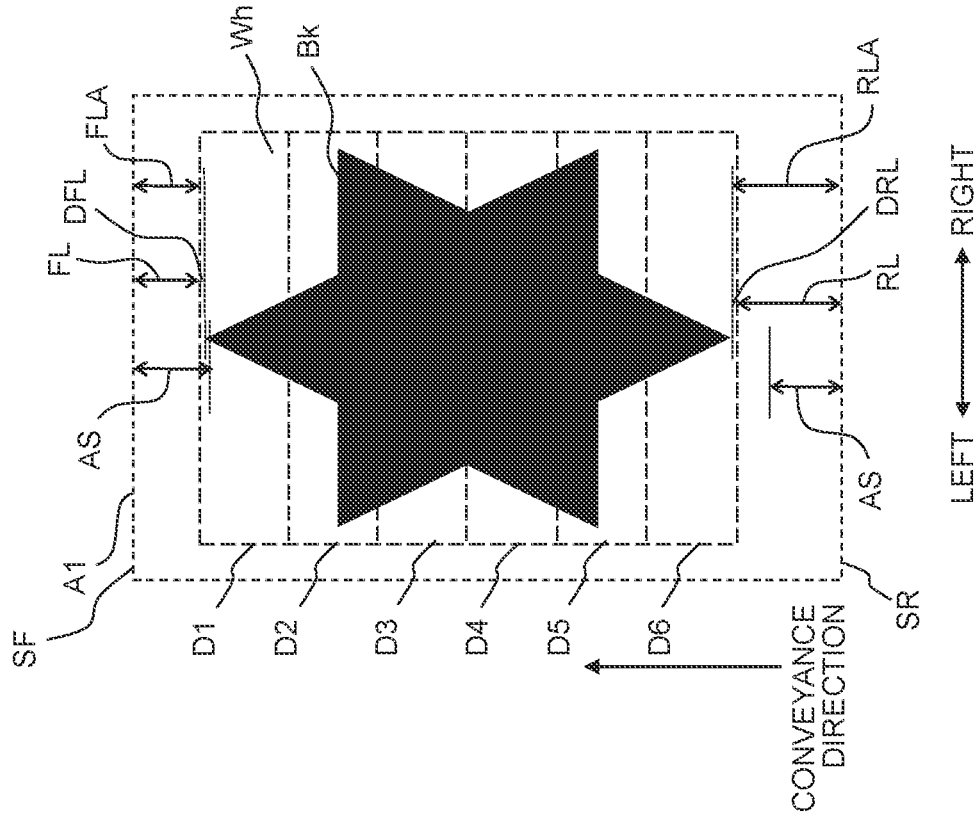

In the step S43, the controller 130 generates front edge margin information FLA. FIG. 10A will be used for explanation about generating the front edge margin information FLA. FIG. 10A shows the path data D1 to D6 arranged in the paper size A1. The path data D1 to D6 are arranged on the upstream side as far as the front edge margin FL from the paper front edge SF in the conveyance direction 15. A front edge data margin DFL is defined to express the distance from the front edge of the path data D1 to the position where the ink is discharged for the first time (that is, the position of Bk) in the conveyance direction. The front edge margin information FLA is the sum of the front edge margin FL and the front edge data margin DFL. The Bk of the path data D1 is the position where the ink is discharged for the first time on the upstream side in the conveyance direction 15.

In the step S44, the controller 130 generates tail edge margin information RLA. The path data D1 to D6 are arranged on the downstream side as far as the tail edge margin RL from the paper tail edge SR in the conveyance direction 15. A tail edge data margin DRL is defined to express the distance from the tail edge of the path data D6 to the position where the ink is discharged for the last time (that is, the position of Bk) in the conveyance direction. The tail edge margin information RLA is the sum of the tail edge margin RL and the tail edge data margin DRL.

Figure 10B:
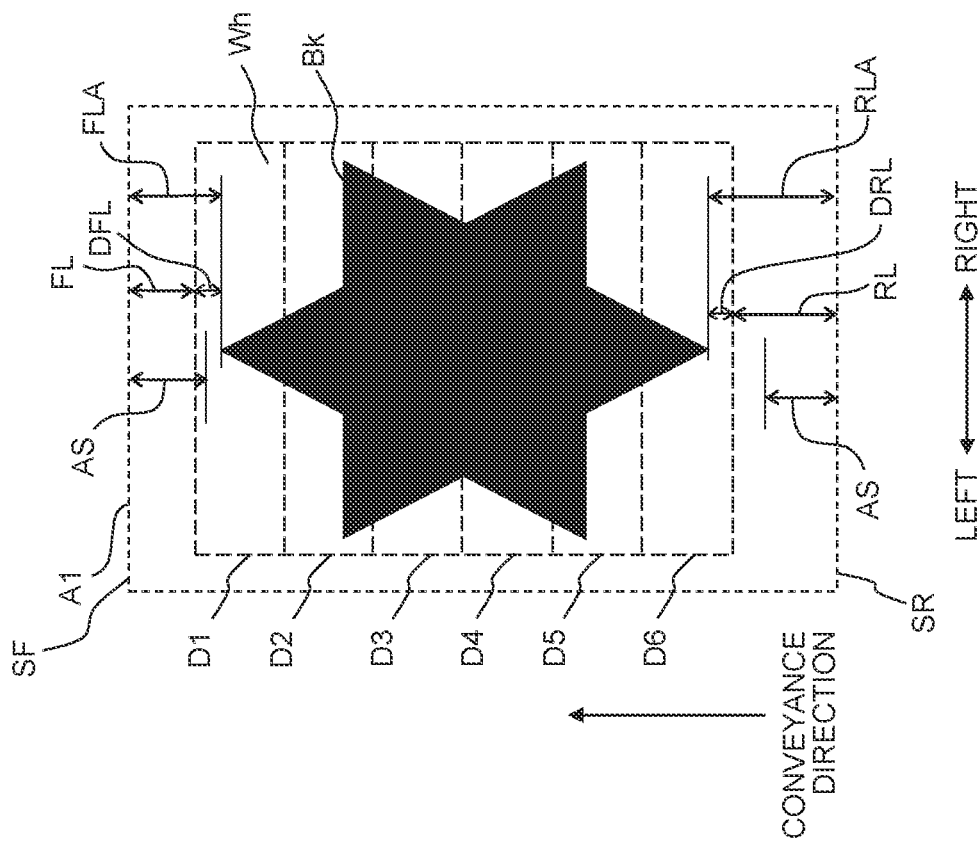

The controller 130 carries out a determining process in the step S45. FIGS. 10A and 10B will be used for explanation about the determining process. The determining process determines whether or not either the front edge margin information FLA or the tail edge margin information RLA is less than a determining threshold value AS. That is, the controller 130 determines whether or not at least one of a first reference value based on the front edge margin FL and a second reference value based on the tail edge margin RL is not less than the determining threshold value AS. As depicted in FIG. 10A, the front edge margin information FLA is larger than the determining threshold value AS, and the tail edge margin information RLA is also larger than the determining threshold value AS. Therefore, neither is determined as less than the determining threshold value AS. As depicted in FIG. 10B, the front edge margin information FLA is smaller than the determining threshold value AS whereas the tail edge margin information RLA is larger than the determining threshold value AS. Therefore, one is determined as less than the determining threshold value AS. Note that the controller 130 does not determine whether or not any one of the front edge margin information FLA and the tail edge margin information RLA is less than the determining threshold value AS if the high image quality mode is selected (S31: Yes). Then, the controller 130 carries out the front edge detecting process in the step S33, the first recording preparation process in the step S34, and the recording process in the step S35, if the high image quality mode is selected (S31: Yes). On the other hand, in cases other than the standard mode (S40: No), the controller 130 lets the process proceed to the step S50 and, if the high speed mode is determined in the step S50, the controller 130 determines whether or not any one of the front edge margin information FLA and the tail edge margin information RLA is less than the determining threshold value AS.

The controller 130 divides the flow of the following process on the basis of the result of the determining process in the step S46. If the determining result is not the "less than" (S46: No), then the process proceeds to the step S70 (sign B). In this case, the front edge detecting process is not carried out in the following flow. In other words, the controller 130 does not carry out the front edge detecting process when at least one reference value is not less than the determining threshold value AS between the reference value based on the front edge margin FL and the reference value based on the tail edge margin RL. If the determining result is the "less than" (S46: Yes), then the process proceeds to the step S33 (sign A). In this case, the front edge detecting process is carried out in the following flow. In other words, the controller 130 carries out the front edge detecting process if at least one reference value is less than the determining threshold value AS between the reference value based on the front edge margin FL and the reference value based on the tail edge margin RL. That is, if any one of the front edge margin information FLA and the tail edge margin information RLA is less than the determining threshold value AS, then the front edge detecting process is carried out, but if neither of the front edge margin information FLA and the tail edge margin information RLA is less than the determining threshold value AS, then the front edge detecting process is not carried out.

In the step S70, the controller 130 carries out a second recording preparation process. The controller 130 causes the printer to convey the sheet 12 from the stop position P1 to a stop position P5 which is the position for the discharge module to record for first time on the sheet 12. Referring to FIG. 9A, a more detailed explanation will be made. The controller 130 causes the printer to convey the sheet 12 up to the stop position P4 where the paper size A1 for the path data D1 fits the position of the sheet 12 for the path data D1 depicted in FIGS. 9A to 9C. On this occasion, because in the step S70, the front edge detecting process was not carried out in the previous flow, the conveyance is started with the stop error H existing between the stop position Pt and the actual stop position P2. Hence, the controller 130 controls the printer to convey the sheet 12 from the stop position P2 to the stop position P5 through the same distance as from the stop position P1 to the stop position P4, keeping the stop error H as it is. As a result, the paper front edge SF stops at the position deviating as much as the stop error H.

Figure 9C:
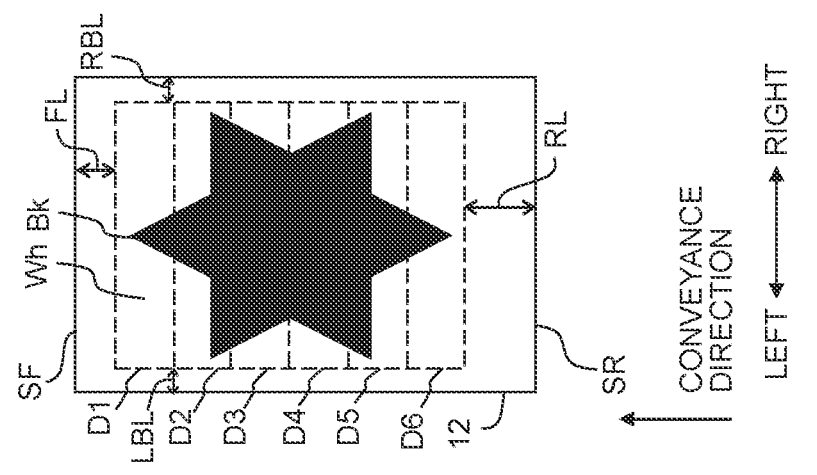
FIG. 9C shows a result of the recording process carried out without carrying out the front edge detecting process.

FIG. 9C shows what is recorded in the position deviating by the stop error H. The paper front edge SF deviates by the stop error H, and the front edge of the image recorded on the sheet 12 in the conveyance direction 15 is not recorded in the position of the front edge margin FL from the paper front edge SF. However, in FIG. 10A, the margin is still determined as large even in both the front edge margin information FLA and the tail edge margin information RLA. That is, it can be said that even if the stop error H is predicted, the deviation of the image does not much affect the appearance obviously. Therefore, even if the front edge detecting process is not carried out, it can still be certain that the image is affected little in appearance, thereby not giving rise to a problem.

In the step S50, the controller 130 determines that it is of the high speed mode. The controller 130 starts the positioning process in the step S51. Because the positioning process of the step S51 is the same as the step S32, explanation therefor will be omitted.

The controller 130 starts the process of the step S52 in the flow without confirming that the positioning process is completed. The controller 130 confirms whether or not in the acquired path data (the path data D1 to D6), there are dots of the first ink discharge in the conveyance direction 15. If there are not (S52: No), then the process stays still in the step S52. If there are (S52: Yes), then the process proceeds to the step S53. For example, the path data D1 depicted in FIG. 9B has the white dots Wh (blank) and the black dots Bk (dots of ink discharge). That is, if the path data D1 is acquired, it is determined as "Yes".

The controller 130 generates the front edge margin information FLA in the step S53. Details of the generation are the same as in the step S43, and therefore explanation will be omitted.

In the step S54, the controller 130 confirms whether or not the path data transmission completed signal is acquired. If it is acquired (S54: Yes), then the process proceeds to the step S60. If it is not acquired (S54: No), then the process proceeds to the step S55.

In the step S55, the controller 130 confirms whether or not the positioning process is completed. If it is completed (S55: Yes), then the process proceeds to the step S56. If it is not completed (S55: No), then the process returns to the step S54.

In the step S56, the controller 130 carries out a determining process only for the front edge margin information FLA currently acquired. That is, in cases other than the standard mode (S40: No), the controller 130 determines the mode as the high speed mode in the step S50. Further, after generating the front edge margin information FLA in the step S53, the controller 130 carries out the determining process only for the front edge margin information FLA currently acquired, when the path data transmission completed signal is not acquired in the step S54 (S54: No) and the positioning process is completed in the step S55 (S55: Yes). In other words, in cases other than the standard mode (S40: No), the determining process is carried out only for the front edge margin information FLA currently acquired. Details of the determining process are the same as in the step S45, and therefore explanation will be omitted.

The controller 130 divides the flow of the following process on the basis of the result of the determining process in the step S57. If the determining result is not the "less than" (S57: No), then the process proceeds to the step S70 (sign B). If the determining result is the "less than" (S57: Yes), then the process proceeds to the step S33 (sign A). That is, the controller 130 carries out the front edge detecting process if only the reference value based on the front edge margin FL is less than the determining threshold value.

The controller 130 generates the tail edge margin information RLA in the step S60. That is, the controller 130 generates the tail edge margin information RLA in the step S60 when the positioning process is not completed in the step S55 (S55: No) and the path data transmission completed signal is acquired in the step S54 (S54: Yes). Details of the generation are the same as in the step S44, and therefore explanation will be omitted.

In the step S61, the controller 130 confirms whether or not the positioning process is completed. If it is completed, then the process proceeds to the step S45 (sign C).

[Functions and Effects of the Embodiment]

In the above embodiment, the front edge detecting process is carried out only in the case where the front edge margin information FLA and the tail edge margin information RLA are both less than a threshold value. That is, if the front edge margin information FLA and the tail edge margin information RLA are not both less than the threshold value, then it is determined that the apparent image quality is not affected such that the front edge detecting process is not carried out. By virtue of this, it is possible to suppress decrease in the printing speed of the image recording process of the image processing apparatus.

In the above embodiment, the margin generating process is carried out in the printer 10 to generate the front edge margin information FLA and the tail edge margin information RLA. However, that may be carried out in the external processing device 150. By virtue of this, the processing speed for the path data D1 to D6 will be raised in the printer 10. That is, it is possible to suppress decrease in the printing speed of the image recording process of the image processing apparatus.

In the above embodiment, the external processing device 150 carries out the recording data generating process. However, without being limited to that, the printer 10 may carry out the recording data generating process. By virtue of this, it is possible to make use of the present disclosure also for the image data acquired from the external memory 124 or the scanner unit 35.

In the above embodiment, if the high speed mode is selected for placing the priority on recording speed, then after the front edge margin information FLA is acquired, if the positioning process is finished earlier than the tail edge margin information RLA is acquired, then the determining process is carried out only for the front edge margin information FLA. This is because compared to the tail edge margin information RLA, there is a high possibility for the front edge margin information FLA to have a smaller margin. By virtue of this, it is possible to shorten the time from the finish of the positioning process to the acquisition of the tail edge margin information RLA.

In the above embodiment, if the high image quality mode is selected for placing the priority on image quality, then regardless of acquisition of the front edge margin information FLA and the tail edge margin information RLA, the front edge detecting process is carried out. In other words, regardless of the result of the determining process, the front edge detecting process is carried out. By virtue of this, if the high image quality mode is selected, it is possible to record the image in the correct position.

FIGS. 11A and 11B are adapted for explaining an example of modified embodiments. FIG. 11B shows a smartphone as an example of the external processing device 150. The RAM of the external processing device 150 in FIG. 11B stores an application program for determining the condition data for the user to start up the application program and determine an image to be recorded. In this application program, the front edge margin FL and the tail edge margin RL are determined as predetermined margins. The user presses a transmission button A1 to send the image data, the front edge margin FL and the tail edge margin RL. Having received those items, the printer 10 carries out the determining process with the front edge margin FL as the front edge margin information FLA, and the tail edge margin RL as the tail edge margin information RLA, in the case where it is confirmed that the items are received from the target application program.

In the FIG. 11B, being less than the determining threshold value AS is determined for both the front edge margin information FLA being the front edge margin FL and the tail edge margin information RLA being the tail edge margin RL. Therefore, the front edge detecting process is not carried out. In this manner, in a specified program or application program where the margin is predetermined, by carrying out the determining process without taking into consideration the front edge data margin DFL and the tail edge data margin DRL which are the margins due to the recording data of the path data D1 to D6, it is possible to further suppress decrease in the printing speed of the image recording process of the image processing apparatus.

In the above embodiment, there is one determining threshold value AS. However, without being limited to that, there may be two determining threshold values AS: a front edge margin determining threshold and a tail edge margin determining threshold. In this case, the determining process may determine whether or not the front edge margin information FLA is less than the threshold with the front edge margin determining threshold, and whether or not the tail edge margin information RLA is less than the threshold with the tail edge margin determining threshold.

Further, the front edge data margin DFL and the tail edge data margin DRL are generated by the path data after the multivalued process is carried out. However, without being limited to that, for example, the front edge data margin DFL and the tail edge data margin DRL may be acquired from the unprocessed data depicted by the RGB color model or the like, for example. In this case, it is allowable to specify the dots to be converted to the white dots depicted in the data of (R100, G25, B48) and the like, and estimate the distance from the beginning of the data to the position for the other colors than the white to discharge for the first time.

Further, the determining process uses both the front edge margin information FLA and the tail edge margin information RLA. However, without being limited to that, depending on the condition, the determining process may be carried out by selecting either one. For example, it may be determined by making use of information of the print position for printing on the sheets 12, or with the front edge margin alone if the print position is for fitting the front edge. Because the recording data is created from the side of the paper front edge SF toward the paper tail edge SR, the front edge margin information FLA is acquired earlier than the tail edge margin information RLA is acquired. By virtue of this, it is possible to suppress decrease in the printing speed of the image recording process of the image processing apparatus.

Further, it was described above that the recording data is created from the side of the paper front edge SF toward the paper tail edge SR. However, without being limited to that, the recording data may be created from the side of the paper tail edge SR toward the paper front edge SF. In this case, it is possible to acquire the tail edge margin information RLA earlier.

Further, the recording data may be created from both sides of the paper tail edge SR and the paper front edge SF toward the center. In this case, it takes a still shorter time to acquire both the front edge margin information FLA and the tail edge margin information RLA. By virtue of this, it is possible to suppress decrease in the printing speed of the image recording process of the image processing apparatus.

What is claimed is:

1. An image processing apparatus comprising:
a carriage including a recording head and a sensor, and configured to move in a main scanning direction, wherein the recording head is configured to discharge an ink, and the sensor is configured to output a detecting signal according to existence or non-existence of a recording medium;
a conveyer configured to convey the recording medium in a conveyance direction intersecting the main scanning direction; and
a controller configured to carry out:
as an acquiring process, acquiring a recording data for the recording head to record on the recording medium, a front edge margin showing a margin on the front edge side in the conveyance direction from the position where the ink is discharged first in the conveyance direction for the recording medium, and a tail edge margin showing a margin on the tail edge side in the conveyance direction from the position where the ink is discharged last,
as a first determining process, determining whether or not at least one of a first reference value based on the front edge margin and a second reference value based on the tail edge margin is less than a threshold value, and
as a positioning process, controlling the conveyor to position the recording medium to a predetermined upstream place from the recording head in the conveyance direction;
wherein when at least one of the first reference value and the second reference value is less than the threshold value, the controller is configured to carry out:
as a front edge detecting process, controlling the conveyer to convey the recording medium in the conveyance direction from the predetermined place to a detecting position where the sensor outputs the detecting signal, after positioning the carriage such that the sensor is positioned on the path where the recording medium is conveyed,
after carrying out the front edge detecting process, as a first recording preparation process, controlling the conveyer to convey the recording medium in the conveyance direction from the detecting position to a recording start position where the ink is discharged first on the recording medium, and
as a recording process, controlling the recording head to record the recording data onto the recording medium by discharging the ink; and
wherein when at least one of the first reference value and the second reference value is not less than the threshold value, the controller is configured to carry out:
as a second recording preparation process, controlling the conveyer to convey the recording medium in the conveyance direction from the predetermined place to the recording start position where the ink is discharged first on the recording medium, without carrying out the front edge detecting process, and the recording process.

2. The image processing apparatus according to claim 1, wherein the controller is configured to carry out, as a margin generating process, generating front edge margin information based on the front edge margin and tail edge margin information based on the tail edge margin.

3. The image processing apparatus according to claim 1, wherein the controller is configured to carry out, as a data generating process, generating the recording data.

4. The image processing apparatus according to claim 1, wherein when the positioning process has been finished after the front edge margin is acquired but before the tail edge margin is acquired, the controller is configured to carry out, as a second determining process, determining whether or not the first reference value is less than the threshold value.

5. The image processing apparatus according to claim 4, wherein the controller is configured to carry out the second determining process when a high speed mode placing a priority on recording speed is selected.

6. The image processing apparatus according to claim 4, wherein the controller is configured to carry out the front edge detecting process, the first recording preparation process and the recording process without carrying out the first determining process, when a high image quality mode placing a priority on image quality is selected.

7. An image processing apparatus comprising:
a first conveyor configured to convey a recording medium in a conveyance direction;
a sensor configured to detect an edge position of the recording medium;
a discharge module configured to discharge an ink onto the recording medium; and
a controller configured to carry out:
as an image recording process, controlling the discharge module to record an image onto the recording medium based on recording data,
as a detecting process, detecting the edge position of the recording medium by the sensor,
as an acquiring process, acquiring a front edge margin showing a margin positioned downstream from the image in the conveyance direction and a tail edge margin showing a margin positioned upstream from the image in the conveyance direction on the recording medium, and
as a first determining process, determining whether or not at least one of a first reference value based on the front edge margin and a second reference value based on the tail edge margin reference value is less than a threshold value; and
wherein when at least one of the first reference value and the second reference value is less than the threshold value, the controller is configured to carry out the detecting process, and
wherein the controller is configured not to carry out the detecting process when at least one of the first reference value and the second reference value is not less than the threshold value.

8. The image processing apparatus according to claim 7, wherein the first reference value is the sum of the front edge margin and the distance from the front edge to the position where the ink is discharged first, in the conveyance direction according to the recording data.

9. The image processing apparatus according to claim 7, wherein the second reference value is the sum of the tail edge margin and the distance from the tail edge to the position where the ink is discharged last, in the conveyance direction according to the recording data.

10. The image processing apparatus according to claim 7, wherein the controller is configured to carry out, as a second determining process, determining whether or not a current image quality mode is a high image quality mode for recording the image,
wherein when the current image quality mode is not the high image quality mode, the controller is configured to carry out the first determining process, and wherein when the current image quality mode is the high image quality mode, the controller does not carry out the first determining process.

11. The image processing apparatus according to claim 7, wherein the controller is configured to carry out, as a third determining process, determining whether or not the first reference value is less than the threshold value and,
wherein when the first reference value is less than the threshold value, the controller is configured to carry out the detecting process.

12. The image processing apparatus according to claim 11, wherein the controller is configured to carry out, as a fourth determining process, determining whether or not current image quality mode is a high speed mode for recording the image at a higher speed than a speed in the recording process, and
wherein when the image quality mode is the high speed mode, the controller is configured to carry out the third determining process.

13. The image processing apparatus according to claim 7, further comprising a carriage supporting the discharge module and configured to move in an intersection direction intersecting the conveyance direction,
wherein in the detecting process, after the carriage is positioned such that the sensor is positioned on the path where the recording medium is conveyed, the first conveyor is configured to convey the recording medium in the conveyance direction from the predetermined position to a detecting position where the sensor outputs a detecting signal.

14. The image processing apparatus according to claim 7, wherein the sensor is fitted on the carriage.

15. The image processing apparatus according to claim 7, wherein the first conveyor comprises a conveyance roller and a pinch roller,
wherein the controller is configured to carry out:
as a third determining process, determining whether or not the first reference value based on the front edge margin is less than the threshold value;
as a positioning process, stopping the recording medium in a state of being nipped between the conveyance roller and the pinch roller;
as a fifth determining process, determining whether or not a transmission completed signal is acquired for transmitting the recording data; and
as a sixth determining process, determining whether or not the positioning process is completed, and
wherein when the transmission completed signal is not acquired for transmitting the recording data and when the positioning process is completed, the controller is configured to carry out the third determining process.

16. The image processing apparatus according to claim 15, wherein when the transmission completed signal is acquired for transmitting the recording data and when the positioning process is not completed, the controller is configured to carry out generating the second reference value based on the tail edge margin.

* * * * *